United States Patent [19]

Nadkarni et al.

[11] Patent Number: 4,915,874
[45] Date of Patent: Apr. 10, 1990

[54] CEMENT FOR COLLECTOR BAR-CARBON BLOCK JOINTS OF ELECTROLYTIC CELLS

[75] Inventors: Sadashiv K. Nadkarni, Jonquiere; Lise Castonguay, Chicoutimi-Nord, both of Canada

[73] Assignee: Alcan International Limited, Montreal, Canada

[21] Appl. No.: 85,856

[22] Filed: Aug. 14, 1987

[30] Foreign Application Priority Data

Aug. 20, 1986 [CA] Canada ................................. 516432

[51] Int. Cl.⁴ .............................................. H01B 1/06
[52] U.S. Cl. ..................... 252/511; 252/502; 204/243 R; 524/495; 524/496
[58] Field of Search ................. 252/502, 511, 510; 204/243; 106/97, 472; 524/495, 496

[56] References Cited

U.S. PATENT DOCUMENTS

| | | |
|---|---|---|
| 3,334,040 | 8/1967 | Conrad et al. |
| 3,421,991 | 1/1969 | Hildebrandt ................ 252/502 |
| 3,468,737 | 9/1969 | Hildebrandt ................ 156/293 |
| 3,853,793 | 12/1974 | Brown et al. ................ 252/502 |
| 3,856,574 | 12/1974 | Amagi et al. ................ 252/502 |
| 3,871,986 | 3/1975 | Reamey et al. ................ 252/502 |
| 4,001,104 | 1/1977 | Vadla et al. ................ 204/243 R |
| 4,288,353 | 9/1981 | Eckel et al. ................ 156/337 |

FOREIGN PATENT DOCUMENTS

| | | |
|---|---|---|
| 2251629-A | of 0000 | France . |
| 58098378 | of 0000 | Japan . |
| 2106494-A | of 0000 | United Kingdom . |
| 1268997 | of 0000 | United Kingdom . |

Primary Examiner—Josephine Barr
Attorney, Agent, or Firm—Cooper & Dunham

[57] ABSTRACT

A cement for collector bar-carbon block joints of electrolytic cells, particularly for cells used for the production of aluminum. The cement comprises an aggregate of calcined anthracite or an anthracite/graphite mixture, a settable liquid polymeric binder and a curing agent for causing the binder to set. The cement is formulated so that it has a linear shrinkage of about 0.3 to 1.5% when exposed to the operating temperatures of the cell. The cement maintains a good electrical connection between the collector bar and carbon block without causing cracking of the block or of the cement.

18 Claims, 1 Drawing Sheet

CEMENT FOR COLLECTOR BAR-CARBON BLOCK JOINTS OF ELECTROLYTIC CELLS

BACKGROUND OF THE INVENTION

1. Field of the Invention

This invention relates to cements used for current collector bar-carbon block joints of electrolytic reduction cells using molten salt electrolytes, e.g. those used for the production of aluminum.

2. Discussion of the Prior Art

Aluminum is conventionally produced by the reduction of alumina in a "Hall-Heroult" electrolytic cell provided with a lining made of prebaked carbon blocks. The lining acts both on a refractory material to protect the cell walls and bottom from the hot molten electrolyte and aluminum, and as a cathode for the electrolysis process. Current is conveyed from the carbon lining by steel collector bars which extend into slots in the carbon blocks. The slots are made slightly larger than the collector bars to allow for ease of assembly, different rates of expansion of the steel and carbon and slight movements of the collector bars. However, the electrical connection between the carbon lining blocks and the steel collector bars must be good, so an electrically conductive material is generally used to fill the free space between the bars and the carbon blocks.

The bar-block joint material is conventionally either cast iron rodding or a conductive cement, but both these materials are found to be undesirable in certain respects. The use of cast iron rodding is expensive and many installations are not equipped for its use.

The conductive cement used in the bar-block joints is traditionally a hot ramming mix consisting of a carbonaceous aggregate, such as calcined anthracite, and a binder, such as pitch or a tar-pitch mixture. The mix is tamped into the joint at a temperature of about 100° C. to 130° C. The use of pitch or tar-pitch mixtures as a binder causes environmental problems. During the filling of the joints, workers are exposed to tar fumes from the hot mix and to noise generated by tamping tools.

Attempts have been made to overcome these problems by providing room temperature cements. However, these cements must be capable of maintaining a good electrical contact between the collector bars and the carbon blocks and of forming a cathode assembly having no cracks or gaps since the cathode assembly serves as a container for the molten bath and metal. We have found that commercially available room temperature cements are not very satisfactory because they form joints having low conductivities or cause the blocks to crack at the high operating temperatures of electrolytic cells.

SUMMARY OF THE INVENTION

Accordingly, an object of the present invention is to provide an improved conductive cement which overcomes the above disadvantages.

According to the invention there is provided a conductive cement for collector bar-carbon block joint of electrolytic cells, which comprises: an aggregate selected from the group consisting of calcined anthracite and mixtures of calcined anthracite and graphite; a settable liquid polymeric binder; and a curing agent for causing said binder to set; said cement having a linear shrinkage falling within the range of about 0.3 to 1.5% when exposed to normal operating temperatures of an electrolytic cell.

DESCRIPTION OF THE INVENTION AND THE PREFERRED EMBODIMENTS

Figure 1:
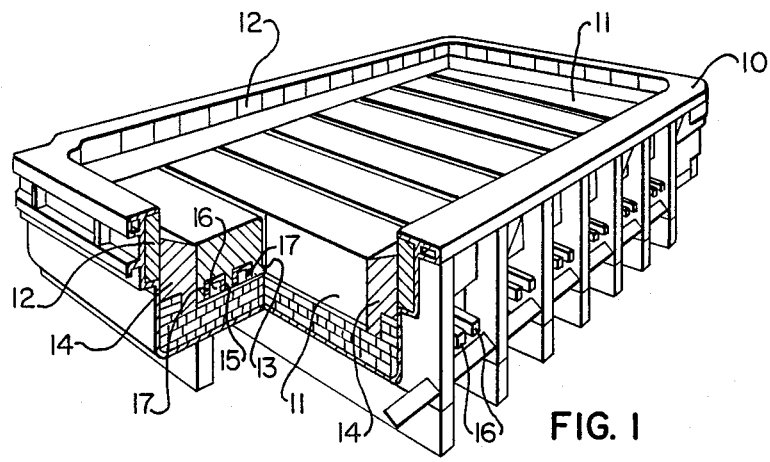
FIG. 1 is a perspective view, partly in section, of the bottom of a conventional electrolytic cell used for the production of aluminum.
Figure 2:
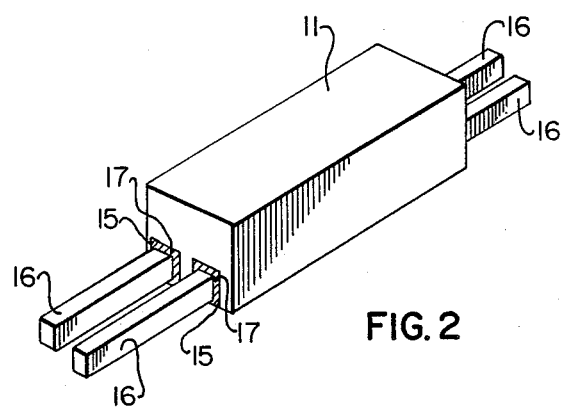
FIG. 2 is a perspective view, on an enlarged scale, of one of the bottom blocks used in the cell of FIG. 1 showing a pair of collector bars mounted therein.
Figure 3:
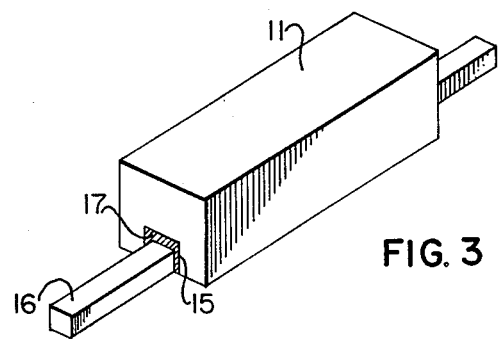
FIG. 3 is a view similar to FIG. 2 of an alternative bottom block which accommodates only a single collector bar.

The cell of FIG. 1 has a steel shell 10 lined with bottom cathode blocks 11 and sidewall blocks 12. The joints between the adjacent bottom blocks are filled with a tamping mix 13 and the joints between the bottom blocks and the sidewall blocks are filled with a so-called monolithic mix 14. The bottom blocks 11 have one or more slots 15 (see FIGS. 2 and 3) in their bottom walls for accommodating steel collector bars 16 which extend at their free ends outside the steel shell 10. The free space around the bars 16 in the slots 15 is filled with a conductive bar-block joint cement 17, which is the subject of the present invention.

When the cement is subjected to cell operating temperatures, the polymeric binder carbonizes and the cement in the slot shrinks whereas the adjacent steel bar and the slot carbon expand. We have now found that the extent by which the cement shrinks is critical to the success of the cement in maintaining good electrical contact and good joint integrity. The expansion of the steel is almost four times higher than the slot carbon and this difference is partly compensated for by the shrinkage of the cement in the slot. We have found that if the cement shrinks by too little, the net thermal strain at the joint exceeds a critical value and the blocks tend to crack. On the other hand, if the cement shrinks by too much, then gaps form between the bar and the block, resulting in poor electrical contact. We have found that a shrinkage range for the cement of about 0.3 to 1.5% avoids these problems when the cement is used in bar-block joints having the normal spacing of 10 to 25 mm.

The aggregate used in the cement of the present invention is calcined anthracite or an anthracite-graphite mixture. The anthracite aggregate particles preferably have a size distribution (granulometry) comprising less than 30% by weight of a +10 Tyler mesh fraction and between 15 and 30% by weight of a −200 Tyler mesh fraction. When an anthracite-graphite mixture is employed, the −200 Tyler mesh fraction of the anthracite is partially or completely replaced by graphite particles preferably having a size of −200 Tyler mesh. Hence, the mixture may contain 0 to 30% by weight of graphite. The presence of graphite reduces the electrical resistivity of the cement and is therefore desirable.

The particle size distribution of the aggregate is significant because the particles should be small enough to permit the cement to flow into the narrow space between the bar and the block without appreciable pressure but they should be large enough to prevent excessive shrinkage of the cement while baking is taking place.

The intermediate particle sizes of the aggregate, i.e. those between 10 to 200 Tyler mesh, are not critical.

However, to optimize the baked density of the cement, it is preferable to use a straight line aggregate while keeping the +10 and −200 fractions within the limits specified above.

The anthracite should be calcined prior to use preferably at a temperature of about 1600° C. to 1800° C. The calcination has the following effects:

(a) it eliminates the volatiles contained in the green anthracite;
(b) it reduces swelling due to sodium absorption; and
(c) it eliminates shrinkage of the anthracite when subjected to high temperatures.

The anthracite or anthracite-graphite particles are then mixed with a binder suitable for use at room temperature and a catalyst to form the conductive cement.

The room temperature binder is preferably any relatively low viscosity polymer or polymer precursor (e.g. prepolymer or monomer) that is (a) capable of binding the anthracite or anthracite/graphite particles together to form a coherent plastic mass that can be worked into a bar-block joint, (b) polymerizable or cross-linkable to make the cement settable, and that (c) has a high carbon yield (preferably of at least 35% by weight, more preferably at least 45% by weight) when carbonized at high temperature in order to impart high electrical conductivity.

The preferred room temperature binder used in the cement is a liquid phenol-formaldehyde resin, a furfuryl alcohol phenolic resin or a furfural-phenol resin, or a precursor thereof. These materials are capable of being polymerized or cross-linked in the presence of a catalyst. If necessary, the materials can be diluted with monomer or with a solvent in order to reduce their viscosities.

In the case of furfuryl alcohol-phenolic liquid resins, these should preferably be capable of being diluted with furfuryl alcohol, and in the case of furfuryl-phenolic resins, these should preferably be capable of being diluted with furfural. The viscosity of the resins themselves at 25° C. should preferably not exceed about 3000 cps, and the viscosities of the diluted resins should preferably not exceed about 300 cps at 25° C. In the case of liquid phenol-formaldehyde resins, these generally have a coking value of about 36% by weight of more and an aromatic amine can be added to increase the coking value to 50% by weight or more. The viscosity of these resins should preferably not exceed about 200 cps at 25° C. If desired, a solid phenolformaldehyde resin may be mixed with a liquid phenolformaldehyde resin of the above-mentioned type, in which case the solid resin should preferably have a coking value of at least 52% by weight, a melting point of about 100°–115° C. and a melt-viscosity at 150° C. of 2000 cps or less.

Examples of specific resin precursors are the following:

1. A furfuryl alcohol-phenolic liquid resin sold under the trade mark LP-340 by the QO Chemicals Company. This resin can be diluted with furfuryl alcohol and has the following properties:
   Viscosity = 3000 cps at 25° C.
   (but the viscosity can be varied from 50 to 3000 cps depending on the amount of the diluent used).
   Specific gravity = 1.18
   Pounds/gal = 9.5
   Free phenol content <6%
   Water content <6%.
2. A furfural-phenolic resin sold under the trade mark UP-440 by the QO Chemicals Company. This resin can be diluted with furfural and has the following properties:
   Viscosity = 2500 cps at 25° C.
   (but the viscosity can vary from 50 to 2500 cps depending on the amount of the diluent used).
   Specific gravity = 1.18
   Pounds/gal = 9.5
   Free phenol content = 3%
   Water content <5%.
3. A liquid phenol-formaldehyde resin sold under the trade mark RL-2360 by the Borden Company. This material has the following properties:
   Coking value = 36 to 40%
   When cured with hexa = 50 to 54%
   Viscosity = 100–200 cps at 25° C.
4. A liquid mixture of a solid phenol-formaldehyde resin sold under the trade mark RD-2475 by the Borden Company and the above-mentioned RL-2360. Resin RD-2475 has the following properties:
   Melting point = 100–115° C.
   Melt viscosity at 150° C. = 1000–2000 cps
   Coking value = 52–64%.

The above resin precursors have relatively low viscosities at room temperature and have a high carbon yield. They also develop strong bonds due to their ability to cross-link.

The cement preferably contains 10 to 20% by weight, more preferably 13 to 18% by weight, of the binder, i.e. the resin plus diluent (if used). When a diluent is employed, it is preferably one that will take part in the cross-linking reaction of the binder.

The curing agent employed for curing (i.e. polymerizing and cross-linking) the binder may be of the latent or non-latent type. With a non-latent curing agent, the cement is cured at room temperature. With a latent curing agent, the curing is brought about by heating the cement to an elevated temperature usually above 80° C. (e.g. about 100° C.) generally for at least two hours. This may be achieved, for example, by heating the steel collector bar with a propane torch or the like.

Any curing agent suitable for the resin binders may be employed and particular examples are given as follows (the percentages being by weight):

(1) For furfuryl alcohol-phenolic resins:
(a) latent curing agents (acidic type):
   (i) 50% zinc chloride in water or ethanol
   (ii) 50% maleic anhydride in furfural
   (iii) 50% phthalic anhydride in furfural
   (iv) methyl para-toluenesulfonate
(b) non-latent curing agents (acidic type):
   (i) toluenesulfonic acid
   (ii) benzenesulfonic acid
   (iii) phosphoric acid
(2) For furfural-phenolic resins:
(a) latent curing agents (acidic type):
   (i) 50% zinc chloride in water or ethanol
   (ii) 50% maleic anhydride in furfural
   (iii) 50% phthalic anhydride in furfural
   (iv) methyl para-toluenesulfonate
   (v) granular ammonium chloride
(b) latent curing agents (basic type):
   (i) hexamethylenetetramine
   (ii) triethanolamine
(c) non-latent curing agents (acidic type):
   (i) toluenesulfonic acid
   (ii) benzenesulfonic acid
   (iii) phosphoric acid
(d) non-latent curing agent (basic type):
   (i) triethylenetetramine (ii) diethylenetriamine
(iii) ethylenediamine
(iv) 50% sodium hydroxide solution in water
(3) For phenol-formaldehyde resins:
(a) non latent catalyst
(i) toluenesulfonic acid The latent curing agents may be combined directly with the binder prior to use because curing does not take place until the binder is heated.

Non-latent curing agents may be mixed with the aggregate prior to use. Curing of the resin begins as soon as the binder is subsequently mixed with the aggregate/curing agent mixture. In general, the cement is prepared by mixing the curing agent with the aggregate for 5 to 10 minutes at room temperature followed by addition of the binder and mixing for a further 20 to 25 minutes at room temperature.

The linear shrinkage of the cement can be kept within the range of 0.3 to 1.5% by controlling the particle size distribution of the aggregate and the binder content of the cement within the above-mentioned ranges.

An increased binder content and/or a finer granulometry will result in a higher shrinkage of the cement and, conversely, a decreased binder content and/or a coarser granulometry will result in a lower shrinkage of the cement. Thus, an appropriate shrinkage rate falling within the above range can be obtained by suitably matching the binder content with the granulometry. However, the desired fluidity of the cement is another factor to bear in mind. For example, if a low shrinkage is desired, the amount of binder can be made quite low if a coarse granulometry is employed, but the cement may then be of low fluidity and be difficult to pack into the bar-block joint. Increased amounts of binder and/or finer granulometry lead to increased cement fluidity. Simple experimentation varying the amounts of binder and the granulometry provides optimum cement formulations.

The cement can either be tamped or hand pressed at room temperature into the bar-block joint. If a low binder content and a coarse aggregate are used, the cement is usually tamped. On the other hand, if the binder content is high and the aggregate is fine, the cement is usually hand pressed into the joint.

When a non-latent curing agent is used, the curing takes place at room temperature and the bar-block assembly may generally be handled after about 15 minutes or more but full strength is developed only after 24 hours. When a latent curing agent is used, the cement must be heated to the curing temperature for at least two hours in order to develop full strength. In order to provide a high green density, the cement is preferably divided into a number of small portions and these are separately and firmly packed into the bar-block joint until the joint is filled. Good results are obtained when five or more such portions are used.

Once the bar-block joint has been packed with cement and the cement has cured, the electrolytic cell may be used in the normal way and the high operating temperatures result in carbonization of the binder. The resistivity of the resulting carbonized cement is generally less than 80 $\mu\Omega.m$ and the baked density is generally higher than 1.40 $Mg/m^3$.

The invention is illustrated in more detail below with reference to the following Examples. The invention should not, however, be construed as limited to these Examples. In the Examples, percentages are by weight (where appropriate) unless otherwise stated.

EXAMPLE 1

An aggregate was prepared consisting of electrically calcined anthracite and graphite forming the −200 Tyler mesh fraction. The granulometry is shown in Table 1 below.

TABLE 1

| Fraction (Mesh Tyler) | −10 +28 | −28 +35 | −35 +48 | −48 +200 | −200 |
|---|---|---|---|---|---|
| % (by weight) | 0 | 10.3 | 15.2 | 30.3 | 26.6 |

As can be seen, the proportion of the +10 mesh fraction in the aggregate was 0% and the −200 Tyler mesh fraction was 26.6%. The 10-200 Tyler mesh fraction was a straight line aggregate.

The aggregate was mixed with a sufficient amount of binder to make the binder content of the cement 18%. The binder consisted of 12.6% of furfuryl alcohol-phenolic resin (LP-340) with 5.4% of furfuryl alcohol as a diluent (the percentages being based on the total weight of the cement). The cement also comprised 1.4% of a zinc chloride 50% solution in water as a curing agent.

The curing agent was premixed with the aggregate for 10 minutes at room temperature. The binder was added and mixing continued for another 20 minutes.

The green apparent density of the cement was 1.54 $Mg/m^3$. The cement (prior to being cured) was hand-pressed into a 12 mm bar-block slot. After curing by heating at 100° C. and baking at 500° C. the bar-block adhesion was maintained. The linear shrinkage on baking from room temperature to 970° C. was 0.87%. The properties of the baked cement were as follows:

| Apparent density = | 1.48 $Mg/m^3$ |
|---|---|
| Electrical resistivity = | 37 $\mu\Omega.m$ |
| Compressive strength = | 26.6 MPa |

EXAMPLE 2

An aggregate of electrically calcined anthracite was prepared to contain 26.2% of +10 Tyler mesh fraction and 19.5% of a −200 Tyler mesh fraction. The cement was prepared using 13% of a room temperature binder. The binder consisted of 80% liquid phenol-formaldehyde resin (Borden), 15% solid phenol-formaldehyde resin (Borden), and 5% of an aromatic amine. The cement also comprised 0.62% of toluenesulfonic acid as a room temperature curing agent.

The curing agent was premixed with the aggregate for 5 minutes. The binder was added and mixing continued for 25 minutes.

The mix was tamped at room temperature into a 12 mm bar-block slot. The linear shrinkage on baking of the cement was 0.48%. The properties of the baked cement were as follows:

| Apparent density = | 1.45 $Mg/m^3$ |
|---|---|
| Electrical resistivity = | 72 $\mu\Omega.m$ |
| Compressive strength = | 23.0 MPa |

COMPARATIVE EXAMPLE

Various cements and tamping mixes were formulated and tested for various properties, as follows.

(a) Formulations Tested:

(i) A first commercially available bar-block cement designated Room Temperature Cement A was obtained. It consisted of two components, one solid and one liquid, to be mixed together. The solid component comprised a mixture of graphite and iron particles with solid phenolic resins. The liquid component comprised liquid phenolic resins (and possibly furan resin) with diluents. No separate curing procedure was recommended by the manufacturer.

(ii) A second commercially available bar-block cement designated Room Temperature Cement B was obtained. This was made up of a steel grit aggregate mixed with a carbonaceous binder (soluble in quinoline). The binder content was about 15% by weight. An epoxy binder and an aromatic amine were added to harden the cement at room temperature. The granulometry of the steel grit aggregate is given in Table 2 below.

TABLE 2
GRANULOMETRY OF THE STEEL GRIT AGGREGATE

| Size (Tyler Mesh) | % |
|---|---|
| +6 | 0 |
| −6 +10 | 2.5 |
| −10 +20 | 21.4 |
| −20 +35 | 32.4 |
| −35 +65 | 21.1 |
| −65 +100 | 4.8 |
| −100 +200 | 6.9 |
| −200 | 10.9 |

(iii) Conventional tamping mix prepared by using an anthracite aggregate and pitch-tar mixture as a binder was obtained. The overall binder content was 15% by weight. The granulometry of the aggregate is give in Table 3 below. The mix was prepared by mixing the components at 130° C. for 60 minutes.

TABLE 3
GRANULOMETRY OF TAMPING MIX AGGREGATE

| Fraction (Mesh Tyler) | +3 | −3 +4 | −4 +14 | −14 +28 | −28 +48 | −48 +200 | −200 |
|---|---|---|---|---|---|---|---|
| % | 0.3 | 9.3 | 18.9 | 10.9 | 18.8 | 22.3 | 19.5 |

(iv) Different formulations (referred to hereinafter as Laboratory Cements) were prepared from electrically calcined anthracite or anthracite/graphite aggregate and resin binders marketed under the trade marks LP 340 and UP 440 by Quaker Oats. The resins were diluted with furfuryl alcohol or furfural monomers. Both latent and non-latent catalysts were used to cure the resins. The various formulations are given in Table 4 below.

TABLE 4
EXPERIMENTAL LABORATORY CEMENT FORMULATIONS

| No. | Aggregate | % | Binder Resin | % | Diluent | % | Catalyst Composition | % | Type |
|---|---|---|---|---|---|---|---|---|---|
| 1 | Anthracite | 80.8 | 1 | 13.6 | 1 | 2.4 | NaOH (50%) | 3.2 | Non-latent |
| 2 | " | 83.0 | 1 | 13.8 | 1 | 2.3 | $NH_3Cl$ (powder) | 1.0 | Latent |
| 3 | " | 82.8 | 2 | 12.3 | 2 | 3.7 | $ZnCl_2$ (50%) | 1.2 | " |
| 4 | " | 83.3 | 2 | 12.4 | 2 | 3.7 | $H_3PO_4$ | 0.6 | Non-latent |
| 5 | " | 80.6 | 2 | 13.5 | 2 | 4.5 | $ZnCl_2$ (50%) | 1.4 | Latent |
| 6 | Anthracite graphite | 80.6 | 2 | 13.5 | 2 | 4.5 | " | 1.4 | " |
| 7 | Anthracite graphite | 80.6 | 2 | 12.6 | 2 | 5.4 | " | 1.4 | " |
| 8 | Anthracite graphite | 78.4 | 2 | 14.0 | 2 | 6.0 | " | 1.6 | " |
| 9 | Anthracite graphite | 76.2 | 2 | 15.4 | 2 | 6.6 | " | 1.8 | " |

Resin 1: UP 440
Resin 2: LP 340
Dilutent 1: furfural
Dilutent 2: furfuryl alcohol The aggregate granulometry is given in Table 5 below.

TABLE 5
GRANULOMETRY OF LABORATORY CEMENT AGGREGATE

| Fraction (Mesh Tyler) | −10 +28 | −28 +35 | −35 +48 | −48 +200 | −200 |
|---|---|---|---|---|---|
| % | 0 | 10.3 | 15.2 | 30.3 | 26.6 |

When anthracite/graphite aggregate was used, the −200 mesh fraction was replaced with graphite (commercial grade, fractions A200, sold by Union Carbide).

The solid component and the catalyst were premixed at room temperature for 10 minutes and then the binder was added. Mixing was continued for another 20 minutes.

(b) Method of Preparation of Specimens

Room Temperature Cements A and B were prepared by mixing the solid and the liquid components in the required proportion and then casting the mix in 38 mm diameter metal moulds.

The Laboratory Cements were formulated as described above. These were filled at room temperature into graphite moulds of 38 mm diameter and pressed by hand to obtoined good packing. The specimens prepared from mixes with latent catalyst were cured at 100° C. to set. Those prepared with non-latent catalyst were exposed to air for 3 days to set.

The tamping mix specimens were fabricated by pressing the mix (at 130° C.) in 38 mm diameter moulds at a pressure of 15 MPa (2000 psi).

The Room Temperature Cements were packed in coke and baked to 970° C. at an average heating rate of 20° C./h. The Laboratory Cement specimens were baked to 970° C. in a dilatometer while measuring dimensional changes.

(c) Testing Procedures

The properties of the test samples such as green and baked density (ASTM Methods D71 and C559), electrical resistivity (ASTM Method C611), air permeability and compressive strength (ASTM MEthod C695) were determined. Dimensional changes during baking (25° C. to 970° C.) were measured (using a dilatometer) at a heating rate of 30° C./h.

Adhesion between a bar and the cement was determined by assembling in the laboratory a bar-block joint and then determining the force required to separate the two at a specified temperature. The bar-block assembly was fabricated using a piece of cathode block (255 mm×255 mm×130 mm) with a slot of appropriate dimensions and a collector bar piece (66 mm×115 mm×130 mm). The joint was made by tamping (in the case of the tamping mix) or by filling or by hand pressing (in the case of cements). The bar-block assembly was placed sideways (with the bar end facing upward) inside a furnace and heated to specified temperatures. The temperature of the block was recorded using thermocouples. The steel bar was forced out of the block and the force of separation was recorded.

The volatiles evolved from the laboratory cements and the conventional tamping mix were monitored at different temperatures using a laboratory physical model. The condensables were analyzed quantitatively for total soluble matter and polycyclic aromatic hydrocarbons (PAH) present and qualitatively for all different constituents, such as phenols, etc.

(d) Results

Mix specimens made from Room Temperature Cement B deformed appreciably during baking. Shrinkage was so excessive that almost 15% of the specimen on one side disappeared. The specimens also appeared extremely porous. Owing to this, the cement was considered unsuitable and further specimen properties were not monitored.

Room Temperature Cement A also did not perform well. After two weeks at room temperature, the cement was not set. Curing at 100° C. are necessary to harden the specimens. The cement shrank extensively during baking which caused cracking of the test specimens.

The properties of the various specimens other than Room Temperature Cement B are given below in Table 6.

TABLE 6

PROPERTIES OF SPECIMENS PREPARED FROM CONVENTIONAL TAMPING MIX, ROOM TEMPERATURE CEMENT A AND LABORATORY CEMENTS

| Type of cement | Green Density $Mg/m^3$ | Baked Density $Mg/m^3$ | Electrical Resistivity $\mu\Omega \cdot m$ | Air Permeability $cm^2/s$ | Compressive Strength MPa | Linear Shrinkage on Baking % |
|---|---|---|---|---|---|---|
| Room Temperature Cement A | 1.39 | 1.76 | 70 | 6 | 11.4 | 22** |
| Conventional Tamping Mix | 1.45 | 1.35 | 103 | 202 | 9.5 | 0.29(0.71)*** |
| Laboratory Cement No.* | | | | | | |
| 1 | 1.36 | 1.32 | 68 | 298 | ND | 1.19 |
| 2 | 1.33 | 1.24 | 96 | 418 | ND | 0.49 |
| 3 | 1.37 | 1.33 | 77 | 159 | ND | 0.71 |
| 4 | 1.41 | 1.35 | 62 | 80 | ND | 1.35 |
| 5 | 1.30 | 1.25 | 119 | 754 | 8.1 | 0.81 |
| 6a | 1.37 | 1.31 | 74 | 12 | 5.4 | 0.68 |
| 6b | 1.51 | 1.45 | 41 | 18 | 16.5 | 0.74 |
| 7 | 1.54 | 1.48 | 37 | 6 | 26.6 | 0.87 |
| 8 | 1.54 | 1.49 | 40 | 12 | 26.0 | 0.97 |
| 9 | 1.55 | 1.49 | 38 | 6 | 24.8 | 1.41 |

ND: Not determined
*Electrodes made with mixes 1 to 5 were pressed with a low hand pressure
Electrode 6a was pressed with an average hand pressure
Electrode 6b were pressed with the maximum hand pressure
**Value indicated by manufacturer
***Volumetric shrinkage in parenthesis The results of the evaluation of the carbon blockbar adhesion are given in Table 7 below.

TABLE 7

ADHESION BAR-BLOCK WITH CONVENTIONAL TAMPING MIX, ROOM TEMPERATURE CEMENT A AND LABORATORY CEMENT

| Force required to separate the bar from the block at specified temperature: | Conventional Tamping Mix (Kg) | Conventional Cement A (Kg) | Laboratory Cement No. 7 (Kg) |
|---|---|---|---|
| 25° C. | 1128 | 215 | ND |
| 100° C. | ND | ND | 1923 |
| 300° C. | 792 | 112 | 1260 |
| 500° C. | 1884 | 91 | 460 |

The force required to separate the bar from the block with Room Temperature Cement A in the joint, decreased with increasing temperature. It was also appreciably lower than the force when the tamping mix was used in the slot. After the test at 500° C., the Room Temperature Cement A in the joint was highly cracked. This was due to the high shrinkage of the cement on baking.

The Laboratory Cement no. 7 was used in the bar-block joint. The adhesion was tested at 100° C. after curing the joint and subsequently at 300° and 500° C. Results were acceptable.

The results of the tests for the evolution of volatiles were as follows.

The Laboratory Cements were packed into the bar-block joints at room temperature. At this temperature, they gave out an odour. However, no volatiles were evolved and therefore no measurements were conducted. The cements thus pose no hazard to workes packing the joints.

Volatiles evolved at 100° C. (at the time of curing) and 550° C. (at the time of baking) are given in Table 8. For comparison, data is included on volatiles evolved from the conventional tamping mix at the time of tamping (130° C.) and at the time of baking (550° C.).

Substantial amount of volatiles were evolved from the Laboratory cement both while curing and while baking, but the proportion of harmful polycyclic aromatic hydrocarbons was very low.

TABLE 8
EMISSION OF VOLATILES ON BAKING OF LABORATORY CEMENT AND TAMPING MIX

| Material | | Laboratory Cement no. 7 | | Tamping Mix | |
|---|---|---|---|---|---|
| Temperature | °C. | 100 | 550 | 130 | 550 |
| Total Volatile Matter | % | 2.2 | 8.8 | 0.12 | 5.3 |
| Condensable Volatile Matter | % | ND | 4.9 | ND | 4.3 |
| | mg/h-100 g | 6.03 | ND | 8.36 | ND |
| PAH/SMD | % | 0.03 | 0.18 | 1.1 | 25.5 |
| PAH | % | ND | 0.01 | ND | 1.10 |
| Others | % | ND | 4.89 (phenol, furan, benzene) | ND | 3.2 (benzene) |

What we claim is:

1. A conductive cement for collector bar-carbon block joints of electrolytic cells, which comprises:
   an aggregate selected from the group consisting of calcined anthracite and mixtures of calcined anthracite and graphite, said aggregate having a particle size distribution comprising less than 30% by weight of a +10 Tyler mesh fraction and between 15 and 30% by weight of a −200 Tyler mesh fraction;
   a settable liquid polymeric binder comprising a material selected from the group consisting of liquid phenol-formaldehyde resin, furfuryl alcohol phenolic resin, furfuryl phenolic resin, and precursors thereof; and
   a curing agent for causing said binder to set;
   the ratio of said binder to said aggregate and the particle size of he aggregate being such that said cement has a linear shrinkage falling within the range of about 0.3 to 1.5% when exposed to normal operating temperatures of an electrolytic cell and said cement is sufficiently fluid at ambient temperatures for introduction into said joints.

2. A cement according to claim 1 wherein the aggregate consists essentially of calcined anthracite.

3. A cement according to claim 1 wherein the aggregate includes graphite forming at least part of said −200 Tyler mesh fraction.

4. A cement according to claim 1 wherein said aggregate comprises 0 to 30% by weight of graphite, the balance being calcined anthracite.

5. A cement according to claim 1 wherein said binder additionally comprises a diluent for said material.

6. A cement according to claim 1 which comprises 13 to 18% by weight of said binder.

7. A cement according to claim 1 wherein said curing agent is a latent curing agent which causes curing of said binder at a temperature above room temperature.

8. A cement according to claim 7 wherein said curing agent is selected from the group consisting of a 50% by weight zinc chloride mixture in water or ethanol, a 50% by weight maleic anhydride mixture in water, a 50% by weight phthalic anhydride mixture in furfural, methyl para-toluene sulfonate, granular ammonium chloride, hexamethylenetriamine and triethanolamine.

9. A cement according to claim 1 wherein said curing agent is a non-latent curing agent which causes curing of said binder at room temperature.

10. A cement according to claim 9 wherein said curing agent is selected from the group consisting of toluene sulfonic acid, benzene sulfonic acid, phosphoric acid, triethylenetetramine, diethylenetriamine, ethylenediamine, 50% by weight sodium hydroxide solution in water and toluene sulfonic acid.

11. A cement according to claim 1 which comprises:
    a mixture of calcined anthracite and graphite comprising about 0% by weight of a +10 Tyler mesh fraction and about 26.6% by weight of a −200 Tyler mesh fraction, said graphite comprising part of said −200 Tyler mesh fraction;
    about 12.6% by weight of a furfuryl alcohol-phenolic resin mixed with about 5.4% by weight of a diluent selected from furfuryl alcohol; and
    about 1.4% by weight of a 50% zinc chloride solution in water.

12. A cement according to claim 1 which comprises:
    calcined anthracite comprising about 26.2% by weight of a +10 Tyler mesh fraction and about 19.5% by weight of a −200 Tyler mesh fraction;
    about 13% by weight of a binder consisting of about 80% by weight of a liquid phenol-formaldehyde resin, about 15% by weight of a solid phenol-formaldehyde resin and about 5% by weight of an aromatic amine; and
    about 0.62% by weight of toluenesulfonic acid as a room temperature curing agent.

13. A cement according to claim 1 which comprises:
    about 80.6% by weight of an aggregate having the following granulometry
    0% by weight of a −10+28 fraction,
    10.3% by weight of a −28+35 fraction,
    15.2% by weight of a −35+48 fraction,
    30.3% by weight of a −48+200 fraction, and
    26.6% by weight of a −200 fraction; said first four fractions above being calcined anthracite particles and said −200 Tyler mesh fraction being graphite particles;
    a binder comprising about 12.6% by weight of a furfuryl alcohol-phenolic liquid resin and about 5.4% of furfuryl alcohol as a diluent; and
    about 1.4% by weight of a 50% aqueous zinc chloride solution as a latent curing agent.

14. A baked cement having a resistivity of about 80 $\mu\Omega$.m or less and a density of 1.40 Mg/m$^3$ or more, said baked cement having been produced by curing and baking a cement according to claim 1 at a high temperature.

15. A multicomponent system each component isolated from the other prior to mixing for forming a cement for a collector bar-carbon block joint of an electrolytic cell, said multicomponent system comprising:
    an aggregate selected from the group consisting of calcined anthracite and mixtures of calcined anthracite and graphite, said aggregate having a particle size distribution comprising less than 30% by weight of a +10 Tyler mesh fraction and between 15 and 30% by weight of a −200 Tyler mesh fraction;
a settable liquid polymeric binder comprising a material selected from the group consisting of liquid phenol-formaldehyde resin, furfuryl alcohol phenolic resin, furfural phenolic resin and precursors thereof; and
a curing agent for causing said binder to set;
the relative amounts of said aggregate and said binder, and the particle size of the aggregate being such that, when the parts of the multicomponent system are mixed, they form a cement having a linear shrinkage falling within the range of about 0.3 to 1.5% when exposed to normal operating temperatures of an electrolytic cell, and being sufficiently fluid at ambient temperatures for introduction into said joints.

16. A multicomponent system according to claim 15 wherein said curing agent is of a non-latent type and is packaged separately from said binder.

17. A multicomponent system according to claim 16 wherein said aggregate and said curing agent are mixed and packaged together.

18. A multicomponent system according to claim 15 wherein said curing agent is of a latent type and is packed in admixture with said aggregate.

* * * * *